(12) United States Patent
Dick et al.

(10) Patent No.: US 6,845,093 B2
(45) Date of Patent: *Jan. 18, 2005

(54) USER EQUIPMENT FOR COMMUNICATING USING A SELECTED CODE OVER A COMMON PACKET CHANNEL

(75) Inventors: Stephen G. Dick, Nesconset, NY (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/075,410

(22) Filed: Feb. 14, 2002

(65) Prior Publication Data

US 2002/0089954 A1 Jul. 11, 2002

Related U.S. Application Data

(63) Continuation of application No. 09/572,796, filed on May 17, 2000.
(60) Provisional application No. 60/134,881, filed on May 19, 1999, provisional application No. 60/135,588, filed on May 24, 1999, and provisional application No. 60/138,922, filed on Jun. 11, 1999.

(51) Int. Cl.[7] ............................................. H04B 7/216
(52) U.S. Cl. ...................................................... 370/342
(58) Field of Search ................................. 370/335–337, 370/320, 342–349, 468, 522, 231; 375/130, 141, 150

(56) References Cited

U.S. PATENT DOCUMENTS

| | | | | |
|---|---|---|---|---|
| 5,339,330 A | * | 8/1994 | Mallinckrodt | 370/320 |
| 5,533,014 A | * | 7/1996 | Willars et al. | 370/335 |
| 5,673,254 A | * | 9/1997 | Crayford | 370/231 |
| 5,883,899 A | * | 3/1999 | Dahlman et al. | 370/468 |
| 6,169,759 B1 | * | 1/2001 | Kanterakis et al. | 375/130 |
| 6,389,056 B1 | * | 5/2002 | Kanterakis et al. | 375/130 |
| 6,507,601 B2 | * | 1/2003 | Parsa et al. | 375/141 |
| 6,577,618 B2 | * | 6/2003 | Diachina et al. | 370/348 |
| 6,606,313 B1 | * | 8/2003 | Dahlman et al. | 370/347 |
| 6,643,318 B1 | * | 11/2003 | Parsa et al. | 375/141 |

OTHER PUBLICATIONS

Molle, M.L. et al; Reducing the Effects of large propagation delays on high speed IEEE 802.3 CSMA/CD networks using collision truncation, Proceedings from 22nd Annual Conference on Local Computer Networks, Nov. 1997, pp. 317–326.*

"Mobile Station–Base Station Compatibility Standard for Wideband Spread Spectrum Cellular Systems", Telecommunications Industry Association, Mar. 1999.

3rd Generation Partnership Project (3GPP), "UTRA FDD; Physical Layer Procedures," TS 25.214 V1.0.0 (Apr. 1999), pp. 1–32.

Agenda Item, TSGR1#7(99)A74, Hannover, Germany, Aug. 30 –Sept. 3, 1999, TSGR1#6(99)A48, Epsoo, Finland, Jul. 13–18, 1999.

Agenda Item, TSGR1#7(99)A73, Hannover, Germany, Aug. 30 –Sept. 3, 1999, TSGR1#6(99)A47, Epsoo, Finland, Jul. 13–18, 1999.

* cited by examiner

Primary Examiner—Chi Pham
Assistant Examiner—Prenell Jones
(74) Attorney, Agent, or Firm—Volpe and Koenig P.C.

(57) ABSTRACT

A user equipment transmits a signature in a selected one of a plurality of time slots of a common packet channel. The common packet channel is defined by a predetermined set of codes and has a plurality of access opportunities. Each access opportunity is defined by a time slot of the plurality of time slots and a signature. An identifier of a selected code of the predetermined set of codes is identified. The selected code is selected from a currently unused code, if available, based on a code association with the access opportunity defined by the selected signature and selected one time slot. The user equipment communicates using the one selected code.

2 Claims, 8 Drawing Sheets

FIG. 8

USER EQUIPMENT FOR COMMUNICATING USING A SELECTED CODE OVER A COMMON PACKET CHANNEL

This application is a continuation of U.S. patent application Ser. No. 09/572,796, filed May 17, 2000, which is a non-provisional application of U.S. Provisional Patent Application Nos. 60/134,881, filed May 19, 1999; 60/135,588, filed May 24, 1999; and 60/138,922, filed Jun. 11, 1999.

BACKGROUND

The invention relates generally to resource allocation in a wireless code division multiple access communication system. More specifically, the invention relates to assigning uplink and downlink channels in response to access requests of user equipment.

FIG. 1 depicts a wireless spread spectrum Code Division Multiple Access (CDMA) communication system 18. A base station 20 communicates with user equipment (UE) 22–26 in its operating area. In a spread spectrum CDMA system 18, data signals are communicated between UEs 22–26 and the base station 20 over the same spread bandwidth. Each data signal in the shared bandwidth is spread with a unique chip code sequence. Upon reception, using a replica of the chip code sequence, a particular data signal is recovered.

Since signals are distinguished by their chip code sequences (code), separate dedicated communication channels are created using different codes. Signals from the base station 20 to the UEs 22–26 are sent on downlink channels and signals from the UEs 22–26 to the base station 20 are sent on uplink channels. For coherent detection of downlink transmissions by the UEs 22–26, pilot signals are transmitted to all the UEs 22–26 within the base station's operating range. The UEs 22–26 condition their receivers based on the pilot signals to enable data reception.

In many CDMA systems, a common packet channel (CPCH) is used for uplink transmissions. A CPCH is capable of carrying packets of data from different UEs 22–26. Each packet is distinguishable by its code. For detection by the base station 20, the packets have a preamble which also distinguishes it from other packets. The CPCH is typically used to carry infrequently communicated data at high rates.

FIG. 2 depicts a CPCH access scheme 28. The CPCH access scheme 28 is time divided into intervals having time slots 30–34, such as 8 time slots proposed for the Third Generation Mobile Telecommunications System (IMT-2000). A group of predetermined signatures 36–40 are assigned to the time slots 30–34 to allow more than one UE 22–26 to use the same time slot 30–34. A particular signature used within a particular time slot is referred to as an access opportunity 66–82. For instance, for each of the 8 time slots in the proposal for IMT-2000, one out of 16 signatures is available to be chosen, resulting in 128 access opportunities. Each signature 36–40 is preassigned a virtual channel. A virtual channel uniquely defines operating parameters for both the uplink and downlink, i.e., an uplink spreading factor and a unique code for the downlink.

Broadcast from the base station 20 to each UE 22–26 is the availability of each virtual channel over an acknowledge indication channel (AICH). The UE 22–26 monitors the AICH to determine the availability of each virtual channel. Based on the operating parameters required by the UE 22–26 and the availability of the virtual channels, the UE determines the access opportunity to select. Upon identifying a particular access opportunity, the base station 20 sends out an acknowledgment message (ACK) if the corresponding downlink channel is still available. In the proposal for IMT-2000, the ACK simply repeats the signatures 36–40 associated with the access attempt. If the downlink channel is not available, a negative acknowledge (NAK) is sent.

After receiving a corresponding acknowledgment, the UEs 22–26 determine the proper code to recover communications on the downlink channel based on the access opportunity 66–82 used to send the UEs' packet. Either stored in the UEs 22–26 or transmitted on a Base Station's Broadcast Channel is a list of the code assigned to each access opportunity 66–82. This scheme severely increases the packet collision probability and therefore the packet delay which is undesirable.

In some situations, monitoring the AICH is not desirable. At a particular moment, some UEs 22–26 will be operating in a "sleep" mode. In the "sleep" mode, the UE 22–26 only runs when there is a need to send data. Monitoring the AICH during "sleep" mode will both reduce battery life and introduce a delay in the transmission of the first packet. Additionally, when a UE 22–26 borders between two base station's operating areas, monitoring multiple AICHs further exacerbates these drawbacks.

Monitoring creates other problems. It further complicates the UE's receiving circuitry, making the UE 22–26 more expensive.

Monitoring results in a suboptimum use of the CPCH. AICH monitoring provides information when a channel becomes busy. The time at which the channel becomes free is deduced on a worst case maximum packet length. If a packet is not maximum length, the channel will be idle while the UEs 22–26 are waiting to transmit. On the other hand, if monitoring is not performed in such a system, channel availability information is unavailable. The UE 22–26 may randomly choose a busy virtual channel increasing the packet delay by causing a collision. Accordingly, it would be desirable to allow the UEs 22–26 to wait a period shorter than the maximum packet length and provide for some other collision reducing mechanism.

One technique to reduce the possibility of collision is to raise the number of codes, for instance to 128 different codes. In the proposal for IMT-2000 the 128 sequences represent approximately half of the sequences available at the base station 20. Accordingly, this solution is undesirable. Additionally, since monitoring the AICH complicates the UE receiver circuitry increasing its cost, it is undesirable. Accordingly, an alternate approach to assign virtual channels is desirable.

SUMMARY

A user equipment transmits a signature in a selected one of a plurality of time slots of a common packet channel. The common packet channel is defined by a predetermined set of codes and has a plurality of access opportunities. Each access opportunity is defined by a time slot of the plurality of time slots and a signature. An identifier of a selected code of the predetermined set of codes is identified. The selected code is selected from a currently unused code, if available, based on a code association with the access opportunity defined by the selected signature and selected one time slot. The user equipment communicates using the one selected code.

BRIEF DESCRIPTION OF THE DRAWING(S)

FIG. 8 is a table of an assignment of Golay sequences.

DETAILED DESCRIPTION OF THE PREFERRED EMBODIMENT(S)

Figure 1:
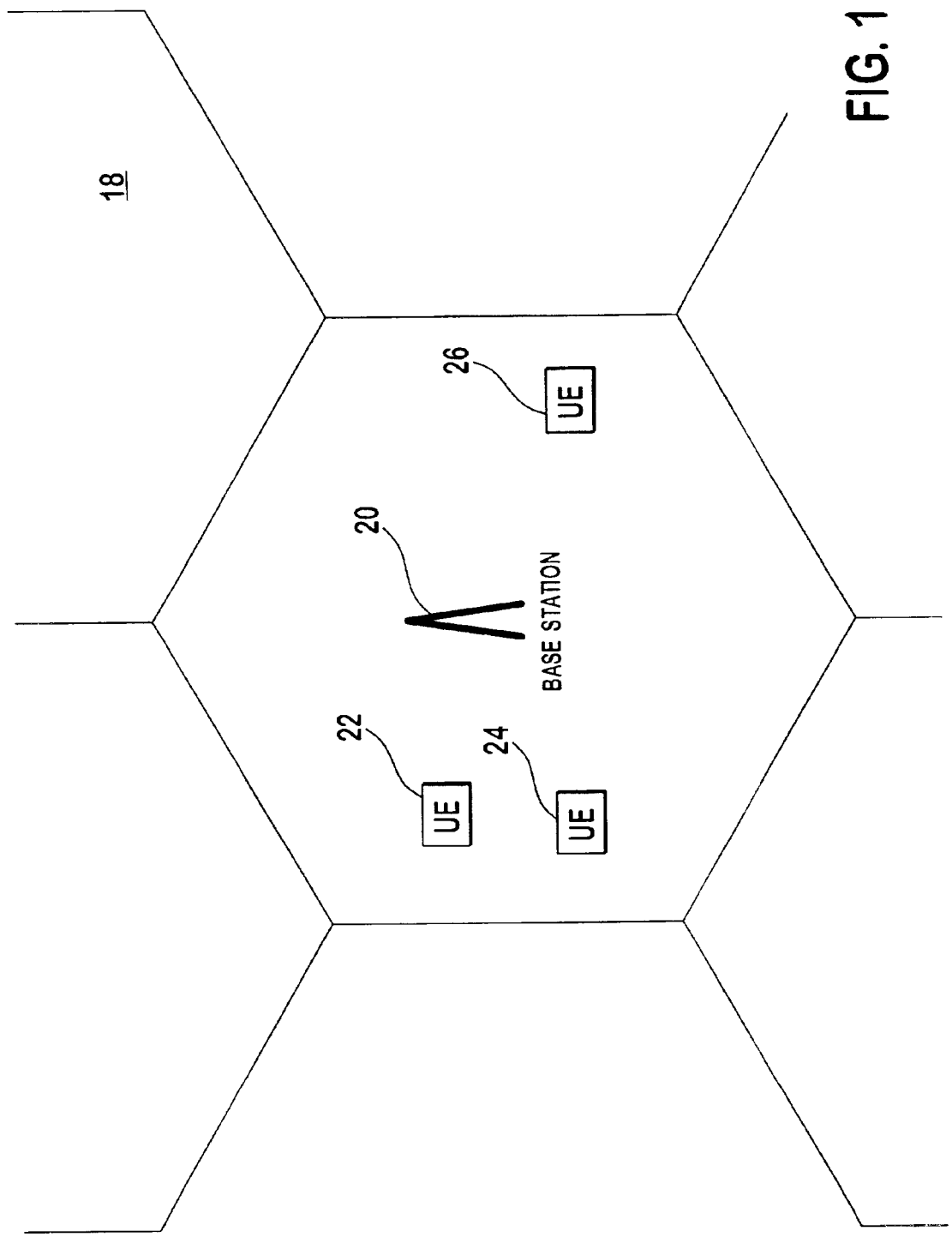
FIG. 1 is an illustration of a typical wireless spread spectrum CDMA communication system.
Figure 2:
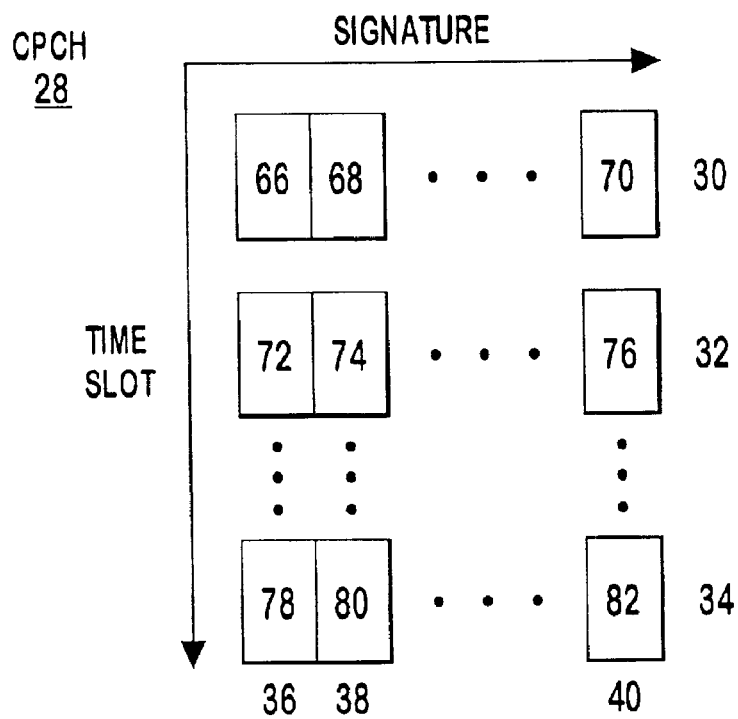
FIG. 2 is an illustration of a common packet channel access scheme.
Figure 3:
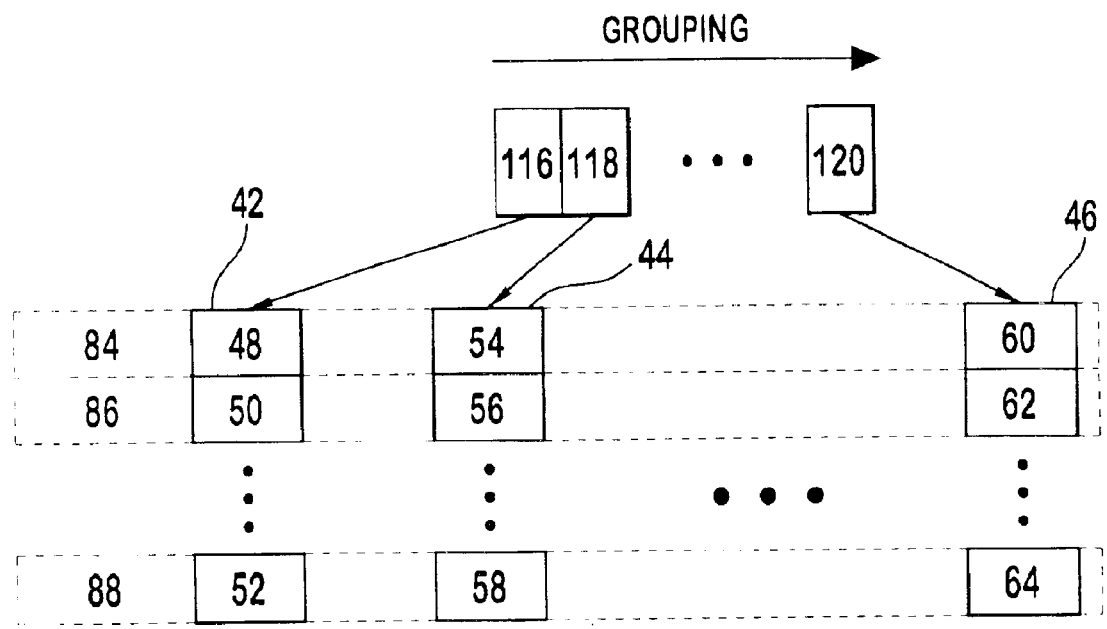
FIG. 3 is an illustration assigning virtual channels.

The preferred embodiments will be described with reference to the drawing figures where like numerals represent like elements throughout. FIG. 3 illustrates a virtual channel assignment scheme. Each virtual channel 48–64 is defined by its operating parameters, such as uplink spreading factor and down link code. Additionally, instead of assigning virtual channels 48–64, the same principles may be applied to assigning physical channels which are defined by their downlink code.

To reduce the number of used physical channels and increase the power level of each channel, each physical channel may be multiplexed, such as by using two time slots. Using two time slots will increase the channel's effective data rate, such as from 8 Kbps to 16 Kbps. In such a system, the virtual channel 48–64 also defines which multiplexed signal is assigned to the UE 22–26.

Instead of assigning a single virtual channel for each signature 36–40 as in the prior art, a set 42–46 of virtual channels are assigned for each grouping 116–120 of access opportunities. A grouping may contain all of the channels in one group or as few as 2 or 3 channels. One possible virtual channel grouping may group all virtual channels with the same data rate for the uplink. For groups having the same uplink data rate, the UE 22–26 selects an access opportunity out of the groups having the UE's desired uplink data rate. Another grouping may be formed based on the access opportunities' signature 36–40. Based on the selected access request and the UE's priority, one of the virtual channels 48–64 assigned to the group 116–120 associated with the access attempt is used for the UE if available. Once the virtual channel is assigned, it will not be assigned again until the particular UE's transaction is complete. Additionally, a receiving circuit at the base station 20 with the proper data rate is assigned to the UE 22–26.

In the prior art system, the UEs 22–26 determine which channel is assigned to the downlink based on the access opportunity 66–82. Virtual channel assignment transmits a channel identifier 84–88, preferably along with the ACK, indicating which of the set 42–46 of channels assigned to the group 116–120 is selected. When all of the virtual channels are in the same group, the identifier 84–88 indicates the selected virtual channel. If no channel is available out of the set 42–46, a no channel is available (NAK) identifier is sent. Since more than one virtual channel is potentially assigned to a particular access attempt, the probability of UE collisions is reduced.

Figure 4:
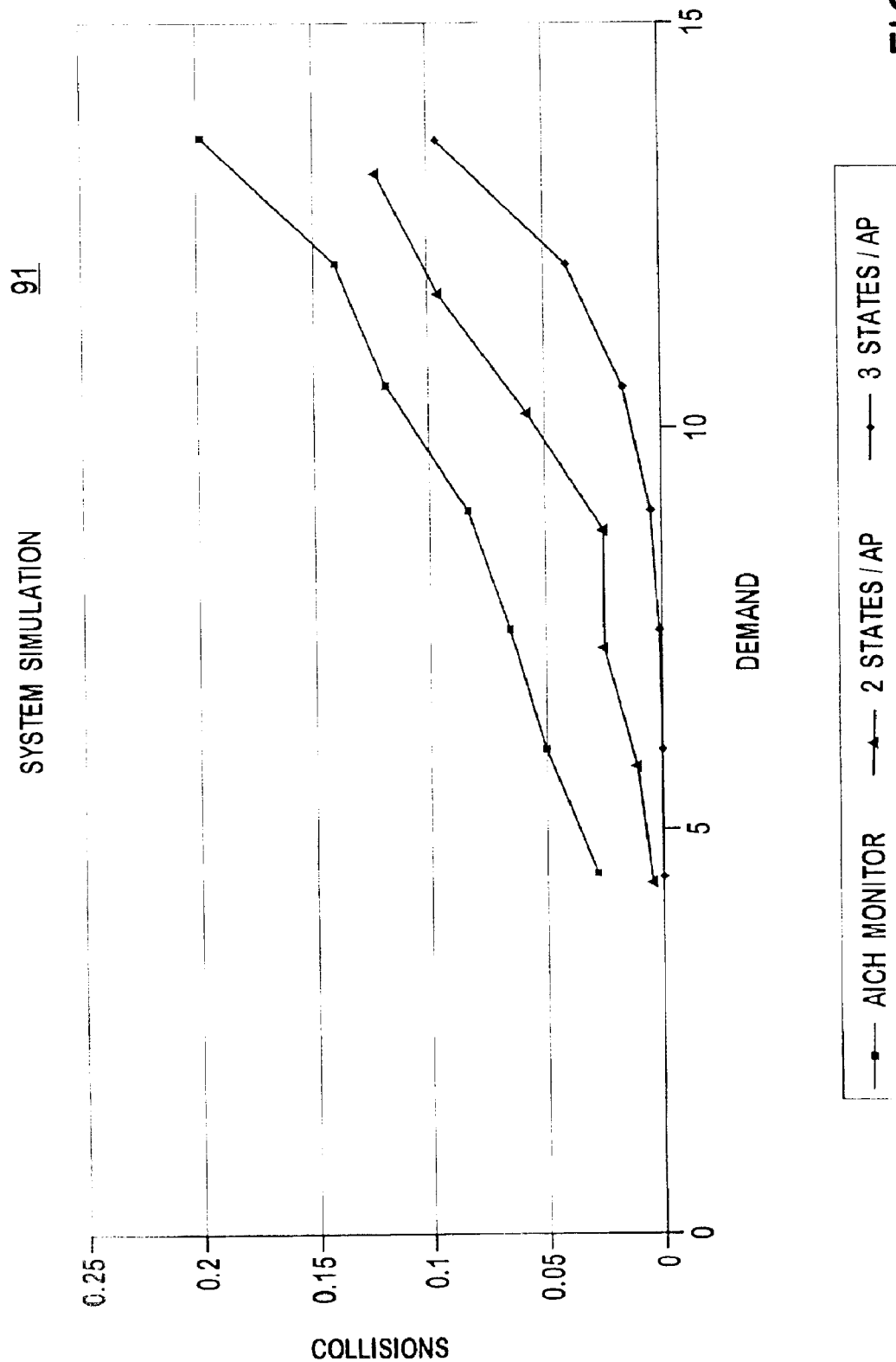
FIG. 4 is a graph of the probability of a collision versus demand for the prior art and the virtual channel assignment.

FIG. 4 is a graph 91 depicting the probability of a collision (Collisions) versus the number of UEs 22–26 requesting access (Demand). As shown, the collisions using 2 or 3 virtual channels per group (2 states/AP or 3 states/AP) is lower than the prior art (AICH monitor) regardless of demand.

Figure 5:
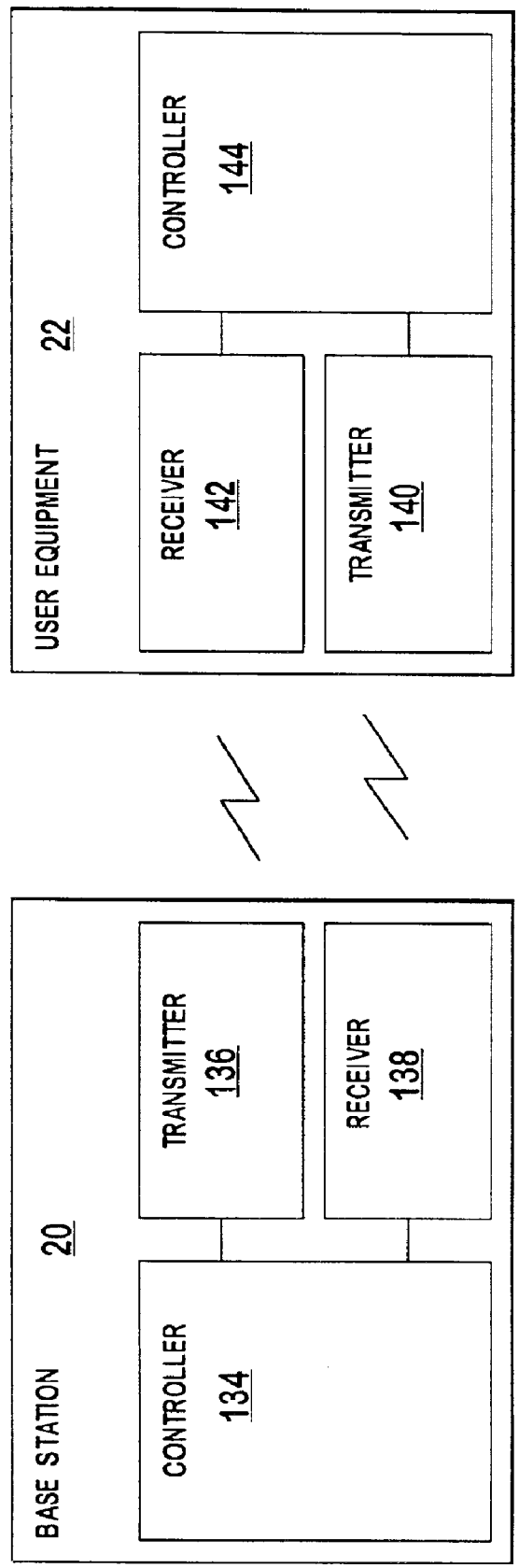
FIG. 5 illustrates a simplified base station and user equipment.

FIG. 5 illustrates a simplified base station 20 and a UE 22 for use in implementing channel assignment. The UE 22 has a controller 144 for determining the code of the uplink and downlink communications. A UE transmitter 140 sends communications, such as access opportunities and uplink packet signals, to the base station 20. A UE receiver 142 receives communications, such as ACK messages, NAK messages and downlink signals.

The base station 20 has a controller 134 for determining the code of uplink and downlink communications as well as determining channel availability. A base station transmitter 136 sends communications, such as ACK messages, NAK messages and downlink signals, to the UE 22. The base station receiver 138 receives communications, such as access opportunities and uplink packet signals.

Figure 6:
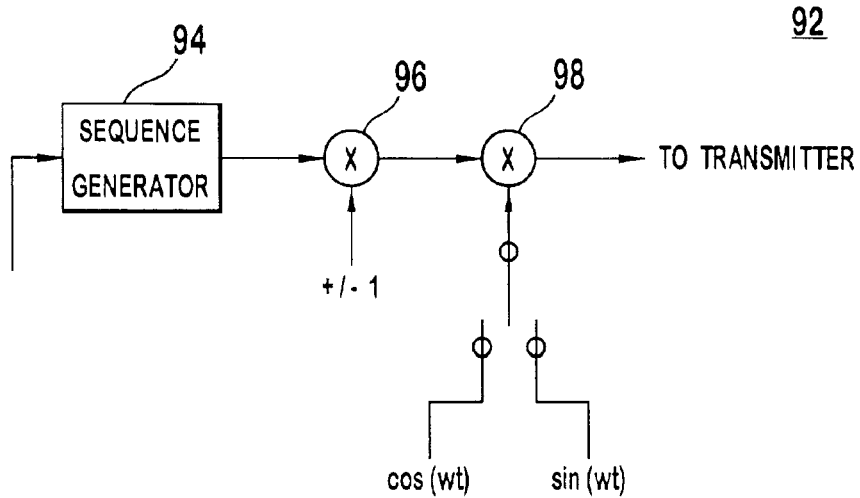
FIG. 6 is an identifier transmitter circuit.
Figure 7:
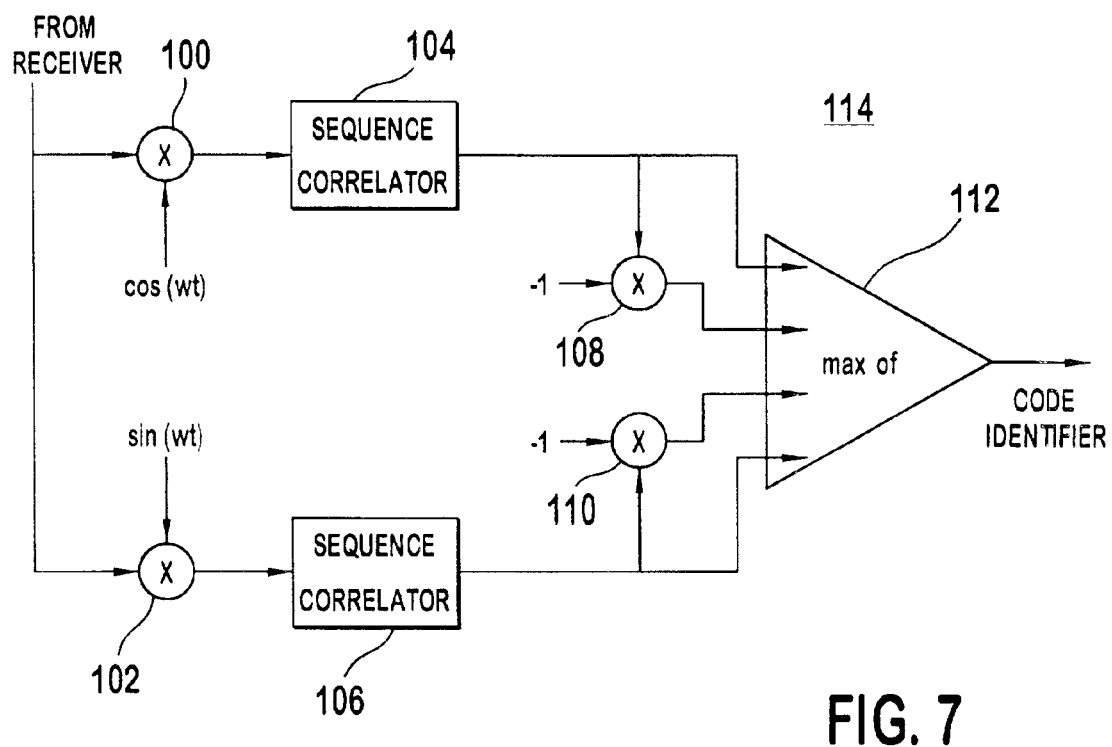
FIG. 7 is an identifier receiver circuit.

Techniques for sending the identifiers are to attach extra bits to the ACK or to change the phase of the ACK to indicate the selected identifier. For a system using a single group of virtual channels, the extra bits identify the selected virtual channel. Circuits for sending the identifiers by phase shifting the ACK are depicted in FIGS. 6 and 7. The circuits are capable of sending up to four channel identifiers without a NAK identifier or three channel identifiers with a NAK identifier. In the transmitter circuit 92 of FIG. 6, the ACK sequence is generated by a sequence generator 94. The sequence itself is associated with the preamble access opportunity and is unique to the access attempt. Several such sequences may be transmitted to several users at the same time. The ACK sequence is passed through a mixer 96 which multiplies the signal with either +1 or −1. The mixed signal is subsequently passed through another mixer 98 where the signal is mixed with an in-phase carrier (cos wt) or a quadrature carrier (sin wt). As a result of the two mixers 96, 98, the transmitted ACK is at one of four phases 0°, 90°, 180° or 270°. Each identifier 84–88 is preassigned to one of the phases.

The receiver circuit 14 of FIG. 7 is used to determine the phase of the ACK sent by the transmitter circuit 92 of FIG. 6. The ACK is mixed with both an in-phase carrier by mixer 100 and a quadrature carrier by mixer 102. Each of the mixed signals are correlated with a replica of the ACK's sequence by sequence correlators 104, 106. The in-phase and quadrature correlation signals are each negated by mixers 108, 110 by multiplying the correlation signals by −1. The two correlated signals and the two negated signals are supplied to an identifier circuit 112. The identifier circuit 112 determines which of the four phased versions of the correlated signal has the highest magnitude. Since the downlink transmissions from the base station are synchronized and their phase is known, the identifier circuit 112 determines which identifier 84–88 was sent based on the phase of the ACK. A list stored either in the UEs 22–26 or transmitted on a Base Station's Broadcast Channel is used to determine the virtual channel 48–64 associated with the identifier 84–88 and the group 116–120 of the UE's access request. Using the determined virtual channel 48–64, transmissions sent by the base station 20 using the selected downlink channel's code are recovered at the UE 22–26.

Another technique for sending the identifier 84–88 is to use the ACK and a collision resolution signal (CR). After a collision between UEs 22–26 is detected at a base station 20, in many spread spectrum systems the base station 20 sends a CR directed to the colliding UEs. The CR has a sequence which is associated with a specific UE 22 for detection by the UE 22. By inverting the ACK and CR, an identifier 84–88 is sent to the specific UE 22. An inverted ACK indicates a NAK. By inverting the CR, one virtual channel is assigned to +CR a second virtual channel is assigned to −CR. Accordingly, using the ACK and CR an identifier indicating either a NAK or one of two channels is sent. Additionally, using a CR with multiple states, such as three, one of multiple channels is assigned to the CR.

Figure 8:
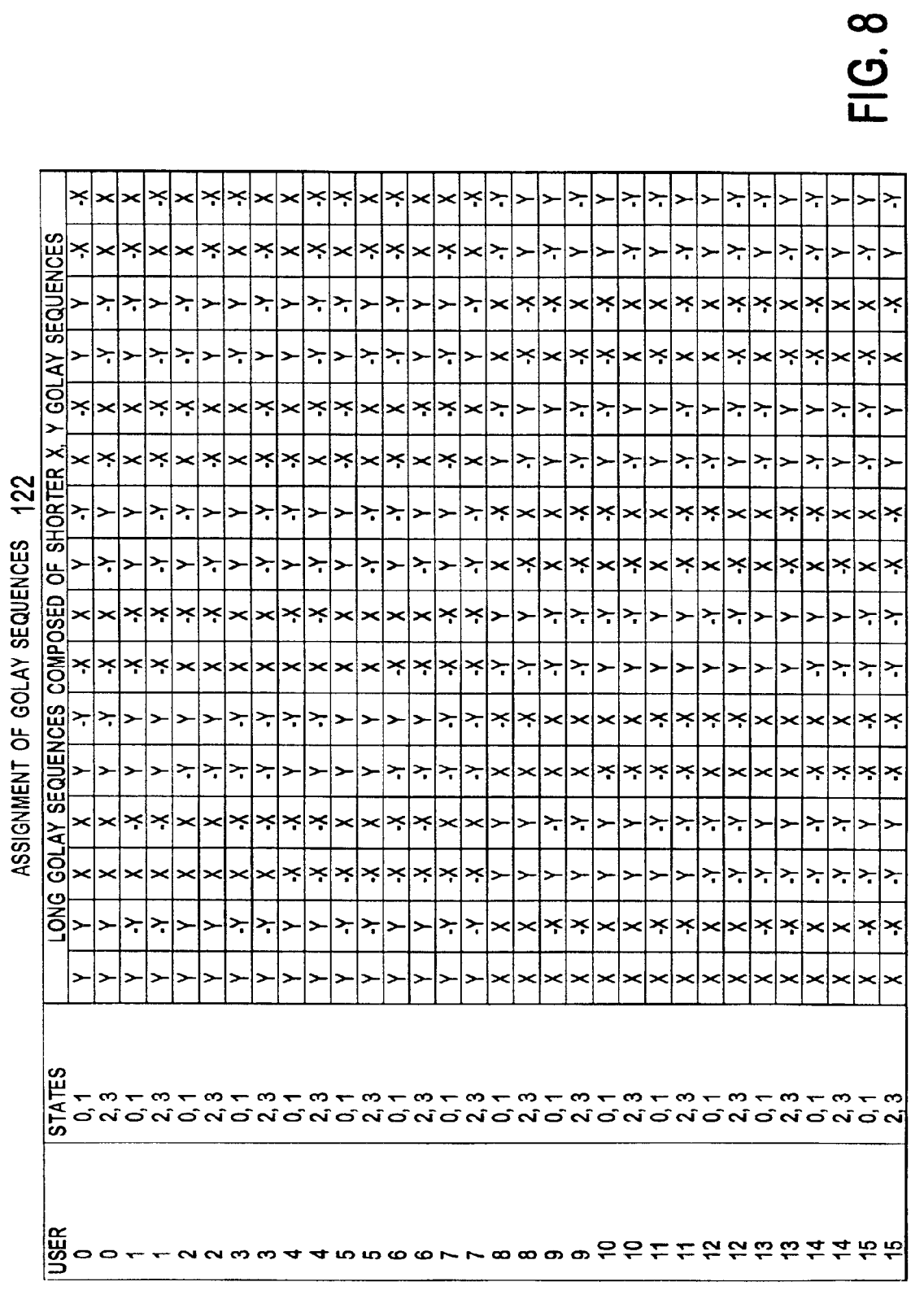

Alternatively, the identifier is sent with a signal using a Golay sequence. A Golay sequence is constructed out of short sequences, such as X and Y. By inverting the shorter sequences and changing their order many unique longer sequences may be constructed as shown in table 122 of FIG. 8. To reduce the size of the table 122, only half of the possible sequences are shown. By negating each sequence, another unique Golay sequence results. As shown in FIG. 8, each UE 22–26 is assigned a unique set of Golay sequences, such as 4. For instance, user 0 is assigned four sequences, the top two sequences and the negation of those sequences. By assigning each of the Golay sequences a virtual channel, upon reception, the receiving UE 22–26 determines the code of the downlink transmission.

Figure 9:
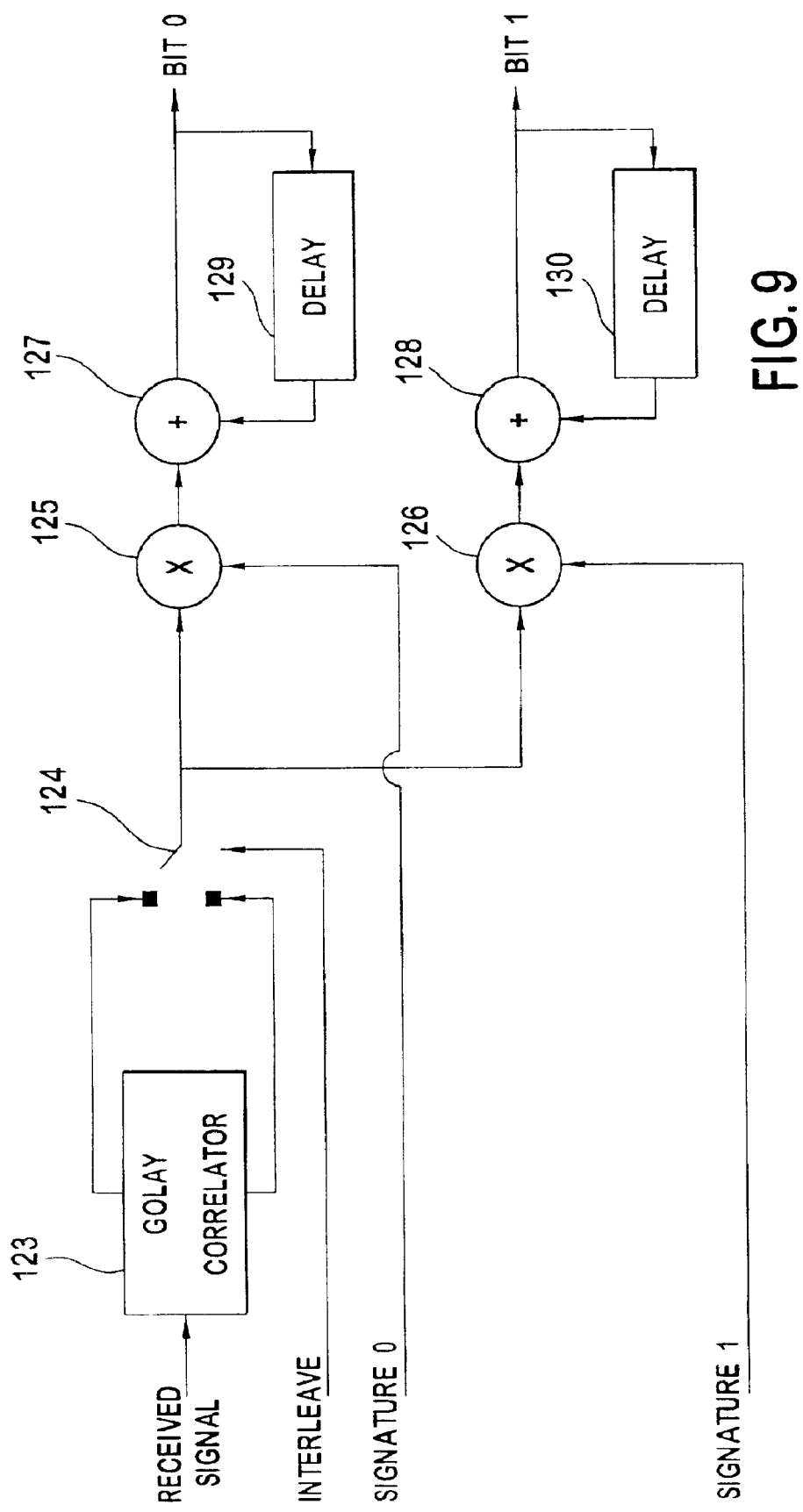
FIG. 9 is a circuit for detecting the Golay sequences of FIG. 8.

A Golay sequence detector is shown in FIG. 9. The received signal is correlated with a Golay Correlator 123 and interleaved by an interleaver 124 to detect the short codes. The arrangement of the short codes for two assigned sequences within the long codes is shown as Signature 0 and 1. Using mixers 125, 126, the signatures are mixed with the detected short codes. Adders 127, 128 are coupled to the mixer and also to delay devices 129, 130. The delay devices 129, 130 take the output of the adders 127, 128 and feed them back to those adders 127, 128 for correlation with the next short sequence. The output of each adder 127, 128 determines the Golay sequence of the received signal.

Figure 10:
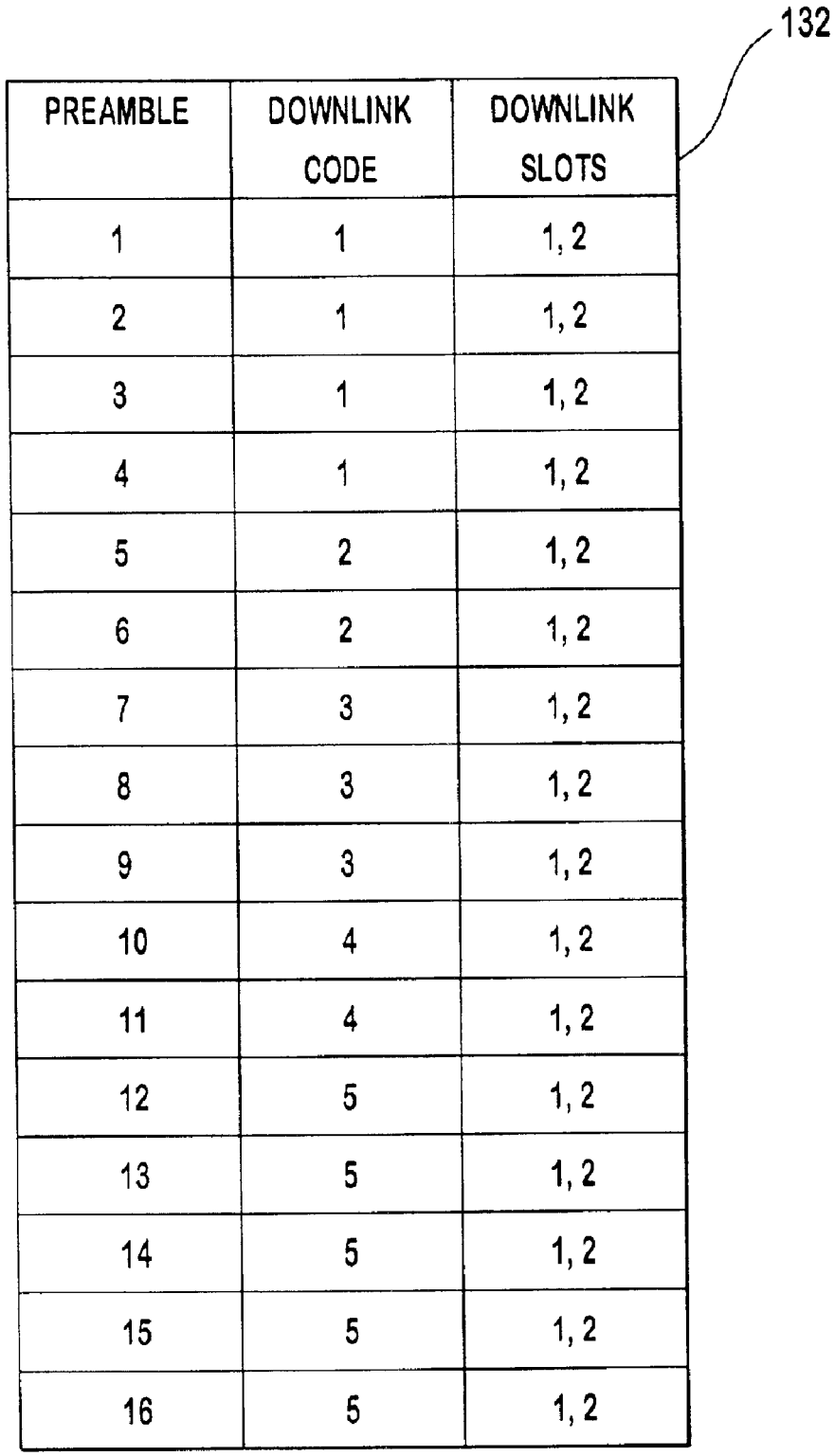
FIG. 10 is an assignment table for a system having physical channels with two time slots.

FIG. 10 illustrates an assignment scheme for a system using two time slot multiplexing for the physical channels. In table 132, each of the sixteen different signatures is assigned a downlink code and one of two time slots. The selected time slot is indicated by the transmitted identifier.

What is claimed is:

1. A user equipment comprising:
    a transmitter for transmitting a selected preamble out of a set of preambles in a slot out of a plurality of slots divided by time of a common packet channel, the common packet channel using a predetermined set of codes; and
    a receiver for receiving a combined collision signal and channel indicator, the channel indicator indicating a selected code out of the predetermined set of codes, the channel indicator being associated with the selected preamble, the combined collision signal and channel indicator distinguishes between codes using an inversion; and
    wherein the user equipment communicates using the selected code.

2. A user equipment comprising:
    means for transmitting a selected preamble out of a set of preambles in a slot out of a plurality of slots divided by time of a common packet channel, the common packet channel using a predetermined set of codes;
    means for receiving a combined collision signal and channel indicator, the channel indicator indicating an a selected code out of the predetermined set of codes, the channel indicator being associated with the selected preamble, the combined collision signal and channel indicator distinguishes between codes using an inversion; and
    means for communicating using the selected code.

* * * * *

UNITED STATES PATENT AND TRADEMARK OFFICE
CERTIFICATE OF CORRECTION

PATENT NO. : 6,845,093 B2
DATED : January 18, 2005
INVENTOR(S) : Dick et al.

It is certified that error appears in the above-identified patent and that said Letters Patent is hereby corrected as shown below:

Title page,
Item [56], References Cited, FOREIGN PATENT DOCUMENTS, insert:
-- WO 9849857    11/98 PCT --.

Column 6,
Line 28, after "indicating", delete "an".

Signed and Sealed this

Seventeenth Day of January, 2006

JON W. DUDAS
*Director of the United States Patent and Trademark Office*